April 21, 1925.
W. H. TICE
WASHER FOR NUT LOCKS
Filed March 8, 1924
1,534,427
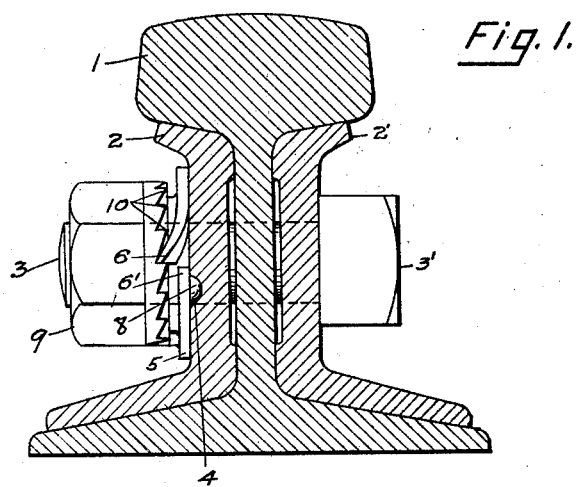
Fig. I.
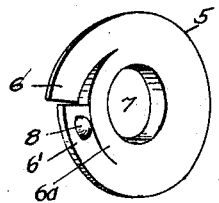
Fig. II.
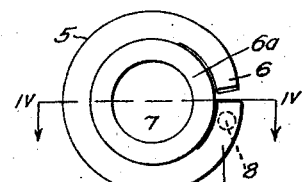
Fig. III.
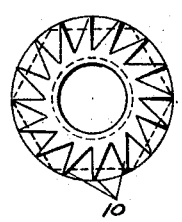
Fig. V.
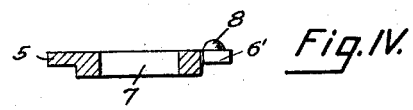
Fig. IV.
Inventor,
Wᵐ H. TICE.
By R.C. Wright,
Attorney.

Patented Apr. 21, 1925.

1,534,427

UNITED STATES PATENT OFFICE.

WILLIAM H. TICE, OF SEASIDE, OREGON.

WASHER FOR NUT LOCKS.

Application filed March 8, 1924. Serial No. 697,875.

*To all whom it may concern:*

Be it known that I, WILLIAM H. TICE, a citizen of the United States, residing at Seaside, in the county of Clatsop and State of Oregon, have invented a new and useful Improvement in Washers for Nut Locks, of which the following is a specification, reference being had to the accompanying drawings.

My invention relates to nut locking devices as a class.

The object of my invention is to provide a device of this kind, wherein there is a washer of particular construction, which engages the nut and also the surface through which the bolt extends, and thereby effects a stop for the nut and prevents it from rotating when in operative position. These objects, as well as other advantages, I attain by the construction, combination and arrangement of parts illustrated in the accompanying drawings which form a part hereof.

Fig. I is a sectional view of a rail and plates, showing the plates secured to the rail by my device in operative position and in side elevation.

Fig. II is a perspective view of the washer.

Fig. III is a top plan view of the washer.

Fig. IV is a sectional view of the washer on the line IV—IV in Fig. III.

Fig. V is a bottom plan view of the nut used with the washer.

Like characters refer to like parts in all views.

The example of application in Fig. I shows a T-rail 1 with fish plates 2—2, which cover a joint in the usual manner. A bolt 3 extends through the plates and rail. The bolt has an integral head 3' to engage the plate 2'. A recess 4 is made in the surface of the plate 2, adjacent to the bolt opening therein. A washer 5 is provided. It has a tongue 6 of convenient length in its outer periphery, the free end of which tongue is split transversely from the opposing washer part. The tongue is also slightly sprung outwardly from the outer plane of the washer hub. The washer has an opening 7 to receive the bolt 3. The washer also has a similar tongue 6' opposite the tongue 6, with a partly spherical lug 8 upon the lower surface of the tongue 6', aligned in a circular plane with the aforesaid recess 4. The washer has a hub 6ª, an integral rim on the hub with integral opposing and peripheral tongues 6 and 6' therein, the inner surface of the hub being flush with the inner surface of the rim and of the tongues if in alignment, the opposite surface of the hub being at a convenient distance beyond the opposite surface of the rim and of the tongues if in alignment. The tongue 6' has a rounded lug on its inner surface; the tongue 6 is sprung outwardly so that its free end extends slightly beyond the plane of the last mentioned hub surface. For this device a nut 9 is provided, having ratchet teeth 10 on its lower surface, positioned to engage the free end of the tongue 6. While the nut 9 is shown with the ratchet teeth, instead thereof small notches or shoulders may be punched, filed or made in the outer and lower periphery surface of the nut, in any manner or form which will allow the nut to be engaged therein by the tongue 6 and the operation will be the same. Any nut of common type may thus be cheaply changed to engage my washer and this is an advantage.

It is now apparent that when the bolt 3 is inserted through the plates and rail, the washer 5 is placed about the bolt, and the nut, superimposed on the washer, is screwed upon the bolt. As the nut is screwed against the washer, the teeth 10 slip over the tongue 6, and as the nut gets closer to the plate 2, the washer may be rotated until the plates are drawn into the close engagement desired, and the lug 8 is moved until it enters the plate recess 4. It will now be observed that the nut can not rotate in the reverse direction because the washer is returned in the position indicated in Fig. I by the engagement of its lug with the plate, and the teeth of the nut being in engagement with the tongue 6. If it is desired to remove the nut a wrench is applied to the nut in the usual way, and the lug, being of partly spherical shape is easily forced out of its recess in the first few rotations, after which the nut is removed without difficulty. In accomplishing this it will be observed that as the nut is thus moved its teeth against the tongue 6 will force the tongue 6' outward and cause its rounded lug to leave the recess, the further movement depresses the tongue 6 and frees the nut so that it can be easily unscrewed and the washer removed. It is the space between the tongues and outer surface of the hub which allows this. While this usually will destroy the washer lug and washer, it is of no consequence, as the washer is cheaply made and the loss is so small that it is insignificant. I am aware of many nut locking devices, but none of them has a split washer and tongues on a hub, with a holding lug on one tongue as mine has, in combination with a nut having the ratchet teeth. My device has been tested in actual operation and is found to function precisely as illustrated and described. The nut is held rigidly in the desired position, and no ordinary vibrations or movements have caused it to work loose and fall away from the operative position in which it may be placed. The device is very simple, cheap in manufacture and embraces new and useful elements.

I claim—

1. In a nut-locking device, the illustrated washer 5 having a hub, an integral rim on the hub with opposing integral, peripheral tongues in the rim, the surface of one end of the hub being flush with one surface of the rim and of the tongues if in alignment, the surface of the opposite end of the hub being at a convenient distance beyond the opposite surface of the rim and of the tongues if in alignment, one of said tongues having a rounded lug on its surface, the other tongue being sprung outwardly so that its free end extends slightly beyond the last mentioned surface of the hub, the said washer being arranged and adapted for the aforesaid tongue lug to engage an opposing recess and retain the washer in a fixed position, the free end of the other tongue to engage a conveniently disposed place of contact in the lower surface of a nut of common type.

2. In a nut-locking device the combination of, the illustrated washer 5, having a hub, an integral rim on the hub with opposing integral, peripheral tongues in the rim, the surface of one end of the hub being flush with one surface of the rim and of the tongues if in alignment, the surface of the opposite end of the hub being at a convenient distance beyond the opposite surface of the rim and of the tongues if in alignment, one of said tongues having a rounded lug on its surface, the other tongue being sprung outwardly so that its free end extends slightly beyond the last mentioned surface of the hub, and a nut of common type having conveniently disposed places of contact in the lower surface thereof, said washer being arranged and adapted to allow the free end of the last mentioned tongue to engage the said places of contact of the nut and prevent it from rotating against the tongue, the washer lug being adapted to be received into engagement in a recess of an opposing surface and retain the washer in a fixed position and prevent the reverse rotation of the adjacent nut.

WILLIAM H. TICE.

Witnesses:
R. O. RALSTON,
D. H. KINCAID.